United States Patent
Iwasa et al.

(10) Patent No.: US 10,550,938 B2
(45) Date of Patent: Feb. 4, 2020

(54) VEHICLE AND METHOD FOR CONTROLLING THE SAME

(71) Applicants: JATCO Ltd, Fuji-shi, Shizuoka (JP); NISSAN MOTOR CO., LTD., Yokohama-shi, Kanagawa (JP)

(72) Inventors: Hiroki Iwasa, Atsugi (JP); Hironori Miyaishi, Sagamihara (JP); Tetsuya Izumi, Ayase (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 223 days.

(21) Appl. No.: 15/559,025

(22) PCT Filed: Feb. 18, 2016

(86) PCT No.: PCT/JP2016/054705
§ 371 (c)(1),
(2) Date: Sep. 15, 2017

(87) PCT Pub. No.: WO2016/152341
PCT Pub. Date: Sep. 29, 2016

(65) Prior Publication Data
US 2018/0080552 A1    Mar. 22, 2018

(30) Foreign Application Priority Data

Mar. 23, 2015 (JP) ................. 2015-059509

(51) Int. Cl.
*F16H 61/662* (2006.01)
*F16H 3/54* (2006.01)
(Continued)

(52) U.S. Cl.
CPC ......... *F16H 61/66272* (2013.01); *F16H 3/54* (2013.01); *F16H 9/18* (2013.01); *F16H 37/022* (2013.01); *F16H 59/18* (2013.01); *F16H 59/54* (2013.01); *F16H 2037/026* (2013.01); *F16H 2059/147* (2013.01);
(Continued)

(58) Field of Classification Search
CPC .................... F16H 61/66272; B60K 6/543
See application file for complete search history.

(56) References Cited

U.S. PATENT DOCUMENTS

| 5,569,114 A | 10/1996 | Matsuda et al. |
| 2009/0176618 A1 | 7/2009 | Inoue |
| 2011/0275464 A1* | 11/2011 | Okubo ............. F16H 61/66272 474/28 |

FOREIGN PATENT DOCUMENTS

| JP | H04-060258 A | 2/1992 |
| JP | H08-288448 A | 10/1994 |

(Continued)

*Primary Examiner* — Derek D Knight
(74) *Attorney, Agent, or Firm* — Foley & Lardner LLP (57) ABSTRACT

A hydraulic pressure controller includes belt sandwiching force increasing means. The belt sandwiching force increasing means increases a belt sandwiching force by a primary pulley and a secondary pulley on the basis of a braking force request from a driver, up to a predetermined value to prevent a belt from slipping due to a braking force. The belt sandwiching force increasing means increases the belt sandwiching force in a range of less than the predetermined value before the braking force request occurs.

9 Claims, 8 Drawing Sheets

(51) Int. Cl.
    *F16H 9/18*      (2006.01)
    *F16H 37/02*     (2006.01)
    *F16H 59/54*         (2006.01)
    *F16H 59/18*         (2006.01)
    *F16H 59/14*         (2006.01)

(52) U.S. Cl.
    CPC .............. *F16H 2061/66277* (2013.01); *F16H 2200/2005* (2013.01); *F16H 2200/2035* (2013.01)

(56) References Cited

FOREIGN PATENT DOCUMENTS

| | | |
|---|---|---|
| JP | 2010-261518 A | 11/2010 |
| JP | 2012-036949 A | 2/2012 |

* cited by examiner

VEHICLE AND METHOD FOR CONTROLLING THE SAME

TECHNICAL FIELD

The present invention relates to a vehicle and a method for controlling the same that prevent a driver from feeling uncomfortable in the vehicle that includes a transmission.

BACKGROUND ART

A conventional belt-type continuously variable transmission configured by bridging a belt across a set of pulleys increases a sandwiching force by the respective pulleys to prevent a belt slip against a torque input from a driving wheel side during a deceleration such as when a brake pedal is pressed.

JP2012-036949A discloses a control device for transmission that inhibits operations of respective shift control solenoids during a sudden braking request of a vehicle to maintain a current speed ratio. Further, the control device for transmission raises a linear solenoid secondary sheave hydraulic pressure to prevent a belt slip. In this respect, the control device for transmission sets the secondary sheave hydraulic pressure large in association with a pressing operation of a brake pedal.

SUMMARY OF INVENTION

The conventional technique described in JP2012-036949A sets a secondary hydraulic pressure large in association with a pressing operation of a brake pedal. When such control is performed, in the case where hydraulic pressures of both pulleys do not increase as targeted due to a lag of response of a primary hydraulic pressure and a secondary hydraulic pressure and a variation of a hydraulic cylinder operation, a change in a difference of a sandwiching force by an amount different from the target possibly varies a speed ratio.

Specifically, with a general belt type CVT, a pressure-receiving area of a primary pulley is set larger than that of a secondary pulley. In view of this, increasing a primary hydraulic pressure and a secondary hydraulic pressure quickens a time until the primary pulley reaches a command hydraulic pressure compared with that of the secondary pulley. In view of this, this causes a difference in rising trends of the primary hydraulic pressure and the secondary hydraulic pressure during a rising control of the hydraulic pressure and breaks a balance of thrust ratios between both pulleys, possibly varying a speed ratio.

The variation of the speed ratio changes a behavior of a vehicle (a front-rear G), providing an uncomfortable feeling with a driver. The larger an amount of change of the secondary hydraulic pressure, the larger a variation width of the speed ratio, making the uncomfortable feeling providing to the driver further remarkable.

The present invention has been made in consideration of such problem and the object is to provide a vehicle that can prevent a variation of a speed ratio during braking and prevent a driver from feeling uncomfortable.

According to one aspect, the present invention provides a vehicle including a variator disposed between a driving source and a driving wheel, which variator has a belt wound around between a primary pulley and a secondary pulley, and a hydraulic pressure controller that changes hydraulic pressures supplied to the primary pulley and the secondary pulley to control a belt sandwiching force. In this vehicle, the hydraulic pressure controller includes belt sandwiching force increasing means that increases the belt sandwiching force by the primary pulley and the secondary pulley on a basis of a braking force request from a driver, up to a predetermined value to prevent the belt from slipping due to a braking force. The belt sandwiching force increasing means increases the belt sandwiching force in a range of less than the predetermined value before the braking force request occurs.

With the aspect, in the case where the execution of the braking force request is planned, the belt sandwiching force is increased in the range of less than the predetermined value prior to the occurrence of the braking force request. Therefore, compared with the case where the belt sandwiching force is increased after the braking force request has occurred, the correction amount of increasing the sandwiching force by the primary pulley and the secondary pulley can be controlled to be smaller. Through such control, the difference in the sandwiching force between the primary pulley and the secondary pulley can be reduced, and thus a change in the speed ratio at the time of the braking force request can be suppressed, and uncomfortable feeling can be prevented to cause in the driver.

DESCRIPTION OF EMBODIMENTS

The following describes embodiments of the present invention with reference to the accompanying drawings.

Figure 1:
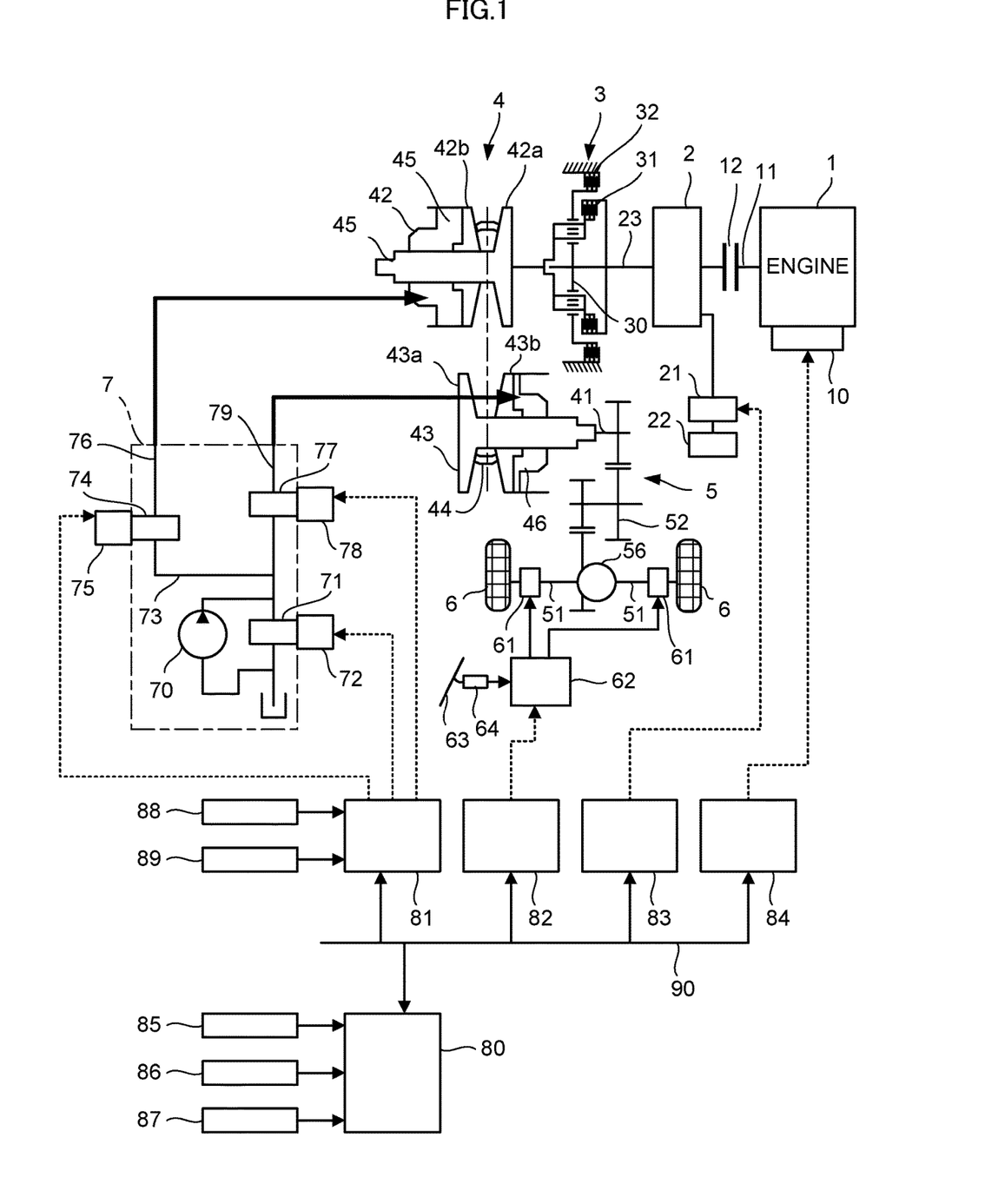
FIG. 1 is an explanatory diagram illustrating a configuration of a vehicle that includes a transmission of an embodiment of the present invention.

FIG. 1 is an explanatory diagram illustrating a configuration of a vehicle that includes a transmission 4 of the embodiment.

The vehicle includes an engine 1 and a motor-generator 2 as a driving source. An output rotation of the engine 1 or the motor-generator 2 is transmitted to driving wheels 6 via a steering reverser mechanism 3, the transmission 4, and a final reduction gear 5.

The engine 1 includes an engine control actuator 10. The engine control actuator 10 operates the engine 1 with a desired torque on the basis of a command from an engine control unit 84, which will be described later, to rotate an output shaft 11. Between the engine 1 and the motor-generator 2, a first clutch 12 is disposed. The first clutch 12 intermits rotation between the engine 1 and the motor-generator 2.

The motor-generator 2 is driven by electric power output from an inverter 21. The motor-generator 2 has regenerative electric power input to the inverter 21. The inverter 21 operates the motor-generator 2 with a desired torque on the basis of a command from a motor control unit 83, which will be described later. The motor-generator 2 is, for example, constituted of a synchronous rotating electrical machine driven by a three-phase alternating current. The inverter 21 is coupled to a battery 22.

The steering reverser mechanism 3 is disposed between the driving source formed of the engine 1 and the motor-generator 2, and the transmission 4. The steering reverser mechanism 3 switches rotation input from an output shaft 23 in a forward rotation direction (forward running) or a reverse rotation direction (reverse running) to input the rotation to the transmission 4. The steering reverser mechanism 3 includes a double-pinion-type planetary gear mechanism 30, a forward clutch 31, and a reverse brake 32. The steering reverser mechanism 3 is switched in the forward rotation direction when the forward clutch 31 is engaged, and in the reverse rotation direction when the reverse brake 32 is engaged.

The planetary gear mechanism 30 is constituted of a sun gear to which the rotation of the driving source is input, a ring gear, and a carrier that supports a pinion gear meshing with the sun gear and the ring gear. The forward clutch 31 is configured to integrally rotate the sun gear and the carrier in an engagement state. The reverse brake 32 is configured to stop rotation of the ring gear in an engagement state.

In the steering reverser mechanism 3, the reverse brake 32 is disposed on the outer peripheral side of the forward clutch 31. Since one of facing materials of the reverse brake 32 in contact with one another during an engagement is a non-rotating member such as a casing, compared with the forward clutch 31 whose both facing materials are rotating members, lubricating oil is less likely to be smoothly supplied and discharged on the facing surface. That is, compared with the forward clutch 31, the reverse brake 32 is less likely to be sufficiently cooled by the lubricating oil, possibly deteriorating the durability due to heat generation. In view of this, to prevent the deterioration of durability of the facing material, the reverse brake 32 is disposed on the outer peripheral side of the forward clutch 31 and the surface area of the facing material is increased compared with that of the forward clutch. Thus, the increase in the heat generation amount is reduced. Due to such reason, the reverse brake 32 is disposed on the outer peripheral side of the forward clutch 31. Therefore, the rotation of the ring gear by the reverse brake 32 can be stopped such that the ring gear disposed on the outer peripheral side is configured as a fixed element, and the double-pinion-type planetary gear mechanism 30 is configured such that the rotation in the reverse rotation direction can be obtained in a state of stopping the rotation of the ring gear. Consequently, a reduction gear ratio during the forward running is set larger than the reduction gear ratio during the reverse running.

One of the forward clutch 31 and the reverse brake 32 of the steering reverser mechanism 3 is configured as a second clutch that intermits the rotation between the engine 1 and the motor-generator 2, and the transmission 4.

The transmission (hereinafter referred to as the variator) 4 is constituted by bridging a belt 44 between a primary pulley 42 and a secondary pulley 43. The transmission 4 is a belt-type continuously variable transmission mechanism (variator) that changes a winding diameter of the belt 44 to shift, by changing respective groove widths of the primary pulley 42 and the secondary pulley 43.

The primary pulley 42 includes a fast pulley 42a and a movable pulley 42b. The movable pulley 42b moves by primary hydraulic pressure supplied to a primary hydraulic chamber 45 to change the groove width of the primary pulley 42.

The secondary pulley 43 includes a fast pulley 43a and a movable pulley 43b. The movable pulley 43b moves by secondary hydraulic pressure supplied to a secondary hydraulic chamber 46 to change the groove width of the secondary pulley 43.

The belt 44 is bridged between a sheave surface having a V shape formed of the fast pulley 42a and the movable pulley 42b of the primary pulley 42 and a sheave surface having a V shape formed of the fast pulley 43a and the movable pulley 43b of the secondary pulley 43.

The final reduction gear 5 transmits output rotation from a transmission output shaft 41 of the variator 4 to the driving wheels 6. The final reduction gear 5 includes a plurality of gear trains 52 and a differential gear 56. Axle shafts 51 are coupled to the differential gear 56 to rotate the driving wheels 6.

The driving wheel 6 includes a brake 61. The brake 61 has braking force controlled by a brake actuator 62 on the basis of a command from a brake control unit 82, which will be described later. The brake actuator 62 controls braking force of the brake 61 on the basis of a detection amount of a brake sensor 64 that detects a pedal force of a brake pedal 63. The brake actuator 62 may be a fluid pressure type. The brake sensor 64 transforms the pedal force of the brake pedal 63 into brake fluid pressure. Based on this brake fluid pressure, the brake actuator 62 may control the braking force of the brake 61.

Hydraulic pressure from a shift hydraulic control unit 7 is supplied to the primary pulley 42 and the secondary pulley 43 of the variator 4.

The shift hydraulic control unit 7 includes a regulator valve 71 and a line pressure solenoid 72. The regulator valve 71 regulates hydraulic pressure generated by hydraulic oil (also used for lubricating oil) output from an oil pump 70 to a line pressure PL. The line pressure solenoid 72 operates the regulator valve 71. The line pressure PL is supplied to a first pressure regulating valve 74 and a second pressure regulating valve 77 by a line pressure oil passage 73. The first pressure regulating valve 74 is operated by a primary hydraulic pressure solenoid 75 to supply the primary hydraulic pressure to a primary pressure oil passage 76. The second pressure regulating valve 77 is operated by a secondary hydraulic pressure solenoid 78 to supply the secondary hydraulic pressure to a secondary pressure oil passage 79. The line pressure solenoid 72, the primary hydraulic pressure solenoid 75, and the secondary hydraulic pressure solenoid 78 operate corresponding to a command from a CVT control unit 81 to control the respective hydraulic pressures. The shift hydraulic control unit 7 also supplies the lubricating oil to the steering reverser mechanism 3, the variator 4, and the like.

The CVT control unit 81, the brake control unit 82, the motor control unit 83, the engine control unit 84, and a hybrid control module 80, which will be described later, are communicatively coupled to one another via a CAN 90.

Signals from a primary rotation sensor 88, a secondary rotation sensor 89, and the like are input to the CVT control unit 81. The CVT control unit 81 transmits the command to the shift hydraulic control unit 7 on the basis of the input signal. The hydraulic pressure of the shift hydraulic control unit 7 is also supplied to the variator 4 and the steering reverser mechanism 3. The CVT control unit 81 also controls the engagement states of the forward clutch 31 and the reverse brake 32 of the steering reverser mechanism 3.

The hybrid control module 80 manages consumption energy of a whole vehicle. The hybrid control module 80 controls the consumption energy to enhance energy efficiency by controlling the driving of the engine 1 and the motor-generator 2.

Signals from an accelerator position sensor 85, a vehicle speed sensor 86, an inhibitor switch sensor 87, and the like and information from the respective control units via a CAN communication line are input to the hybrid control module 80. The hybrid control module 80 calculates a target driving torque and a target braking torque from these signals and information. A fluid pressure braking torque is a remain that regenerative braking torque portion, which is a maximum regenerative torque portion that can be generated in the motor-generator 2, is subtracted from the target braking torque. The target braking torque is obtained from a sum of the regenerative braking torque and the fluid pressure braking torque. The hybrid control module 80 performs regeneration at the motor-generator 2 in deceleration to recover the electric power.

The brake control unit 82 outputs a driving command to the brake actuator 62 on the basis of a control command from the hybrid control module 80. The brake control unit 82 obtains information of the brake fluid pressure that is being generated in the brake actuator 62 to transmit the information to the hybrid control module 80.

The motor control unit 83 outputs a target power running command (a positive torque command) or a target regeneration command (a negative torque command) to the inverter 21 on the basis of the control command from the hybrid control module 80. The motor control unit 83 detects an actual current value and the like applied to the motor-generator 2 to obtain actual motor driving torque information, thus transmitting the information to the hybrid control module 80.

The engine control unit 84 outputs the driving command to the engine control actuator 10 on the basis of the control command from the hybrid control module 80. The engine control unit 84 transmits actual engine driving torque information obtained from a rotation speed, a fuel injection quantity, and the like of the engine 1 to the hybrid control module 80.

The hybrid control module 80 performs the control corresponding to the following modes.

The vehicle has an electric vehicle mode (hereinafter referred to as an "EV mode") and a hybrid vehicle mode (hereinafter referred to as a "HEV mode").

The "EV mode" is a mode where the first clutch 12 is in a disengagement state, and the driving source is only the motor-generator 2. The "EV mode" is selected, for example, when a request driving force is low, and a battery SOC (State of Charge) is sufficiently ensured.

The "HEV mode" is a mode where the first clutch 12 is in the engagement state, and the driving source is the engine 1 and the motor-generator 2. The "HEV mode" is selected, for example, when the request driving force is large, or when the battery SOC for driving the motor-generator 2 is insufficient.

The following describes the slip prevention of the belt with the vehicle thus configured.

In the case where the driver presses the brake pedal 63 during running and the vehicle decelerates, the CVT control unit 81 increases the primary hydraulic pressure and the secondary hydraulic pressure to increase the belt sandwiching force to prevent the belt 44 from slipping.

Figure 2A:
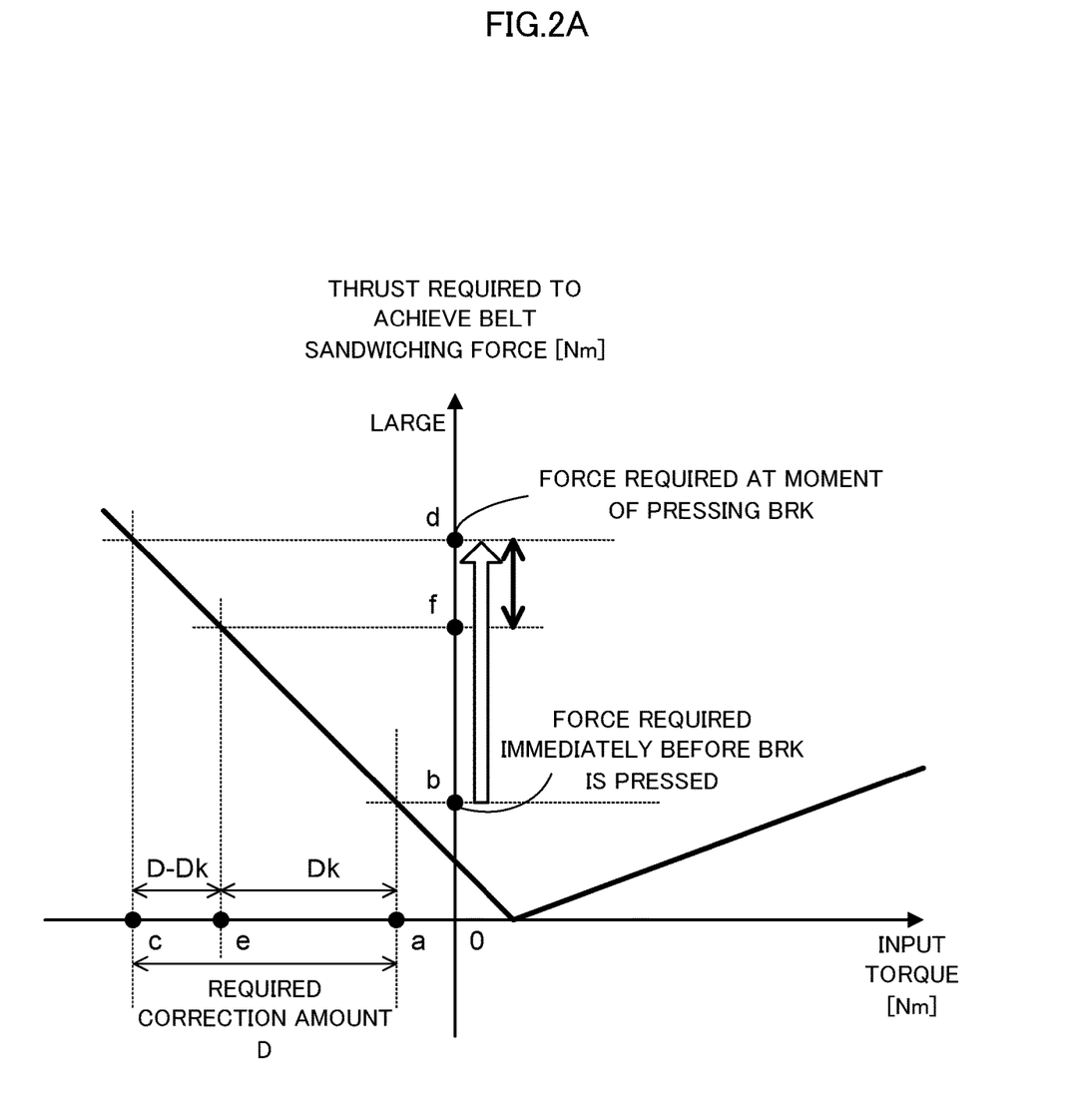
FIG. 2A is an explanatory diagram illustrating a correction amount required to increase a belt sandwiching force of the transmission of the embodiment of the present invention.
Figure 2B:
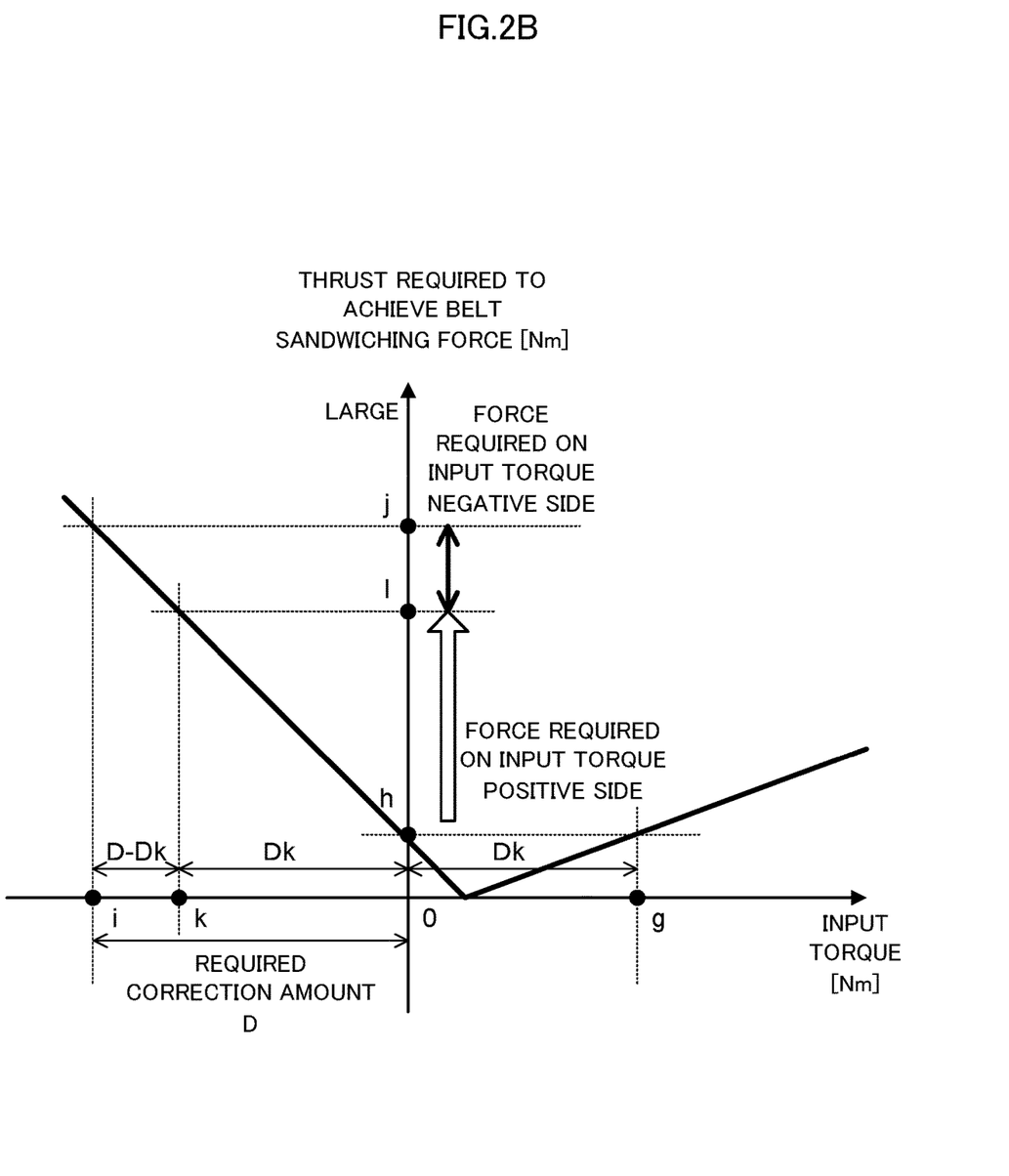
FIG. 2B is an explanatory diagram illustrating the correction amount required to increase the belt sandwiching force of the transmission of the embodiment of the present invention.

FIG. 2A and FIG. 2B are explanatory diagrams illustrating the input torques to the variator 4 and correction amounts required to increase the belt sandwiching forces during the reverse running of the steering reverser mechanism 3 of this embodiment.

When the vehicle decelerates from the running state, the hybrid control module 80 engages the first clutch 12 and the second clutch for regeneration of the motor-generator 2.

As illustrated in FIG. 2A, a positive torque is input from the engine 1 to the variator 4 during the running. On the other hand, when the vehicle decelerates, a negative torque is input from the driving wheels 6 to the variator 4.

With the steering reverser mechanism 3 of this embodiment, the reduction gear ratio during the forward running while the forward clutch 31 is engaged is configured larger than the reduction gear ratio during the reverse running while the reverse brake 32 is engaged. Accordingly, during the reverse running (during an R range), when the input torque becomes negative, the torque input from the driving wheel 6 side to the driving source side increases the speed at the steering reverser mechanism 3 (a difference in gradient in FIG. 2A). Furthermore, the speed ratio of the variator 4 is fixed in the reverse running. The reduction gear ratio of the embodiment is a value found by dividing an output rotation speed at the steering reverser mechanism 3 by the input rotation speed. That is, the reduction gear ratio is a value found by dividing the input rotation speed of the variator 4 in FIG. 1 by the rotation speed of the output shaft 23.

In view of this, in the case where the deceleration is performed during the reverse running, the negative torque is input to the variator 4. In the negative input torque, the primary hydraulic pressure and the secondary hydraulic pressure need to be increased by a correction amount D illustrated in FIG. 2A to avoid the belt 44 of the variator 4 from slipping.

In the case where the primary hydraulic pressure and the secondary hydraulic pressure are increased by the correction amount D during the deceleration, due to a variation of hydraulic pressure paths and a difference in structures between the primary hydraulic chamber 45 and the secondary hydraulic chamber 46, the hydraulic pressures of the primary hydraulic chamber 45 and the secondary hydraulic chamber 46 do not evenly increase, possibly causing a difference in the hydraulic pressures of both.

In the variator 4, the pressure-receiving area of the primary hydraulic chamber 45 is generally set larger than the pressure-receiving area of the secondary hydraulic chamber 46 due to the following reason. To reduce the required hydraulic pressure of the primary pulley 42 requiring the large sandwiching force on the High side for improvement in the fuel efficiency during running at the speed ratio on the High side such as the running on an expressway, the pressure-receiving area of the primary hydraulic chamber 45 is configured larger than the pressure-receiving area of the secondary hydraulic chamber 46.

To increase the hydraulic pressure in such configuration, when the supplied hydraulic pressures of both pulleys are equally increased, an increase ratio of the primary pulley sandwiching force becomes larger than the increase ratio of the secondary pulley sandwiching force due to the difference in the pressure-receiving areas. That is, when the primary hydraulic pressure and the secondary hydraulic pressure are increased, a time of arrival to a command hydraulic pressure of the primary pulley becomes faster than that of the secondary pulley. In view of this, during the rising control of the hydraulic pressure, the primary hydraulic pressure and the secondary hydraulic pressure differ in the rising trends, breaking a thrust ratio balance between both pulleys. Consequently, the difference in the belt sandwiching forces between both pulleys possibly varies the speed ratio. Especially, with the large amounts of change of the hydraulic pressure, the difference becomes further remarkable.

When the hydraulic pressures differ between the primary hydraulic chamber 45 and the secondary hydraulic chamber 46, the speed ratio changes, possibly providing an unintended acceleration and deceleration feeling to the driver. Especially, the largely pressed brake pedal 63 increases the deceleration; therefore, the belt sandwiching force needs to be quickly increased up to the correction amount D. In this case, the increase in the amounts of change of the hydraulic pressure increases the difference in the hydraulic pressures. This also increases the variation width of the speed ratio, thereby making the uncomfortable feeling provided to the driver further remarkable.

This embodiment employs the following configuration to reduce the increase in the amount of change of the hydraulic pressure during the deceleration of the vehicle so as not to change the speed ratio against the above-described conventional problem.

FIG. 2A illustrates a control to increase the correction amount when the input torque to the variator 4 becomes negative in the reverse running range.

In FIG. 2A, when the input torque is negative and the input torque immediately before the brake pedal is pressed in the reverse running range is indicated by a point a. A thrust of the primary pulley required to achieve the belt sandwiching force to prevent the slip of the belt 44 against this input torque is indicated by a point b.

When the brake pedal is pressed after that, the negative torque input to the variator 4 becomes a point c. A thrust required to achieve the belt sandwiching force to prevent the slip of the belt 44 against this input torque is indicated by a point d. This point c corresponds to the case of the maximum depression amount of the brake pedal.

Thus, the correction amount D corresponding to the difference between the point b and a point d, which are the thrusts required to achieve the belt sandwiching force to prevent the slip of the belt 44 against the variation of the input torque by pressing the brake pedal, needs to be increased.

However, increasing the belt sandwiching force by the correction amount D when the brake pedal is pressed increases the difference in the hydraulic pressures by the increase in the amounts of change of the hydraulic pressure as described above. Accordingly, the variation width of the speed ratio also increases, making the uncomfortable feeling providing to the driver more remarkable.

Therefore, this embodiment sets a second correction amount (D−Dk) where the variation width of the speed ratio caused by increasing the belt sandwiching force does not provide the uncomfortable feeling to the driver before the driver presses the brake pedal (the braking force request is performed). This embodiment calculates the input torque (a point e), which is the negative torque of the first correction amount Dk as the difference between the correction amount D required with the brake pedal pressed by the maximum depression amount and the second correction amount (D−Dk). This embodiment increases the belt sandwiching force up to a thrust (a point f) corresponding to this input torque, from the point b to the point f, that is, by the amount of the first correction amount Dk.

Thus, in the case where the execution of the braking force request is predicted, the belt sandwiching force is preliminary increased by the first correction amount Dk before the execution of the braking force request. Afterwards, to set the correction amount D required when the brake pedal is pressed, only the increase by the second correction amount (D−Dk) is required, thereby ensuring the increased amount when the brake pedal is pressed small. Since the increased amount of the belt sandwiching force corresponding to this becomes the difference between the point f and the point d, allowing the amount of change of the hydraulic pressure small. This can reduce the variation of the speed ratio in association with this change and prevent the driver from feeling uncomfortable. The correction amount D is the correction amount equivalent to the case with the maximum depression amount of the brake pedal. Accordingly, for example, with the brake depression amount smaller than the maximum value, the belt sandwiching force needs not to be increased by the correction amount D by the pressing of the brake pedal (the belt sandwiching force needs not to be increased up to the point d), and the belt sandwiching force is set to the correction amount corresponding to the depression amount of the brake pedal, for example, a value smaller that the correction amount D (for example, between the point f and the point d).

FIG. 2B illustrates a control to increase the correction amount when the accelerator pedal is disengaged in the reverse running range.

FIG. 2A, which is described above, describes the example of the control to the first correction amount Dk when the input torque to the variator 4 becomes negative. Meanwhile, such control possibly fails to increase the belt sandwiching force up to the first correction amount Dk while the brake is ON, for example, in the case where the brake pedal is pressed before the input torque becomes negative. Therefore, the example illustrated in FIG. 2B shows an example of the control to the first correction amount Dk simultaneously with the disengagement of the accelerator pedal (before the input torque becomes negative).

In FIG. 2B, the input torque immediately before the disengagement of the accelerator pedal in the reverse running range is the positive torque. Here, with the accelerator pedal disengaged, in the case where the input torque lowers down to a position corresponding to a point g, the variator 4 is controlled such that the thrust becomes a point h, a thrust corresponding to the input torque at the point g (the first correction amount Dk). After that, when the input torque becomes negative, the second correction amount (D−Dk) where the variation width of the speed ratio caused by increasing the belt sandwiching force does not provide the uncomfortable feeling to the driver is set. The input torque (a point k), which is the negative torque of the first correction amount Dk as the difference between the correction amount D required with the brake pedal pressed by the maximum depression amount and the second correction amount (D−Dk), is calculated. The belt sandwiching force is increased up to a thrust (a point i) corresponding to the input torque (the point k), from the point h to the point i.

When the brake pedal is pressed after that, the negative torque input to the variator 4 becomes the point i, a thrust required to achieve the belt sandwiching force to prevent the belt 44 from slipping against this input torque is indicated by a point j, and the belt sandwiching force is increased from the point i to the point j. This point i corresponds to the maximum depression amount of the brake pedal.

Thus, with the positive input torque, the first correction amount Dk is preliminary increased before the braking force request is performed, especially the accelerator pedal is disengaged, to set the belt sandwiching force at the point h. After that, this decreases the correction amount (the difference to the point j) to configure the required correction amount D when the brake pedal is pressed with the positive input torque. That is, in the case where the belt sandwiching force is not preliminary increased by the first correction amount Dk with the positive input torque, when the brake pedal is pressed, the belt sandwiching force needs to be increased by the difference between the point j and an origin 0. On the other hand, preliminary increasing the belt sandwiching force by the first correction amount Dk increases the belt sandwiching force by the difference between the point j and the point h when the brake pedal is pressed, making the increased correction amount small. Therefore, the amount of change of the hydraulic pressure can be decreased, and the variation of the speed ratio in association with this change is reduced, ensuring preventing the driver from feeling uncomfortable.

That is, in the example illustrated in FIG. 2B, even if the brake pedal is pressed before the input torque becomes negative, the thrust (the point h) corresponding to the first correction amount Dk is set. Therefore, the increased amount to the thrust corresponding to the depression amount of the brake pedal (the point j with the maximum depression amount of the brake pedal) is reduced. Accordingly, the amount of change of the hydraulic pressure can be decreased and the variation of the speed ratio in accordance with this change is reduced, thereby ensuring preventing the driver from feeling uncomfortable.

Figure 3:
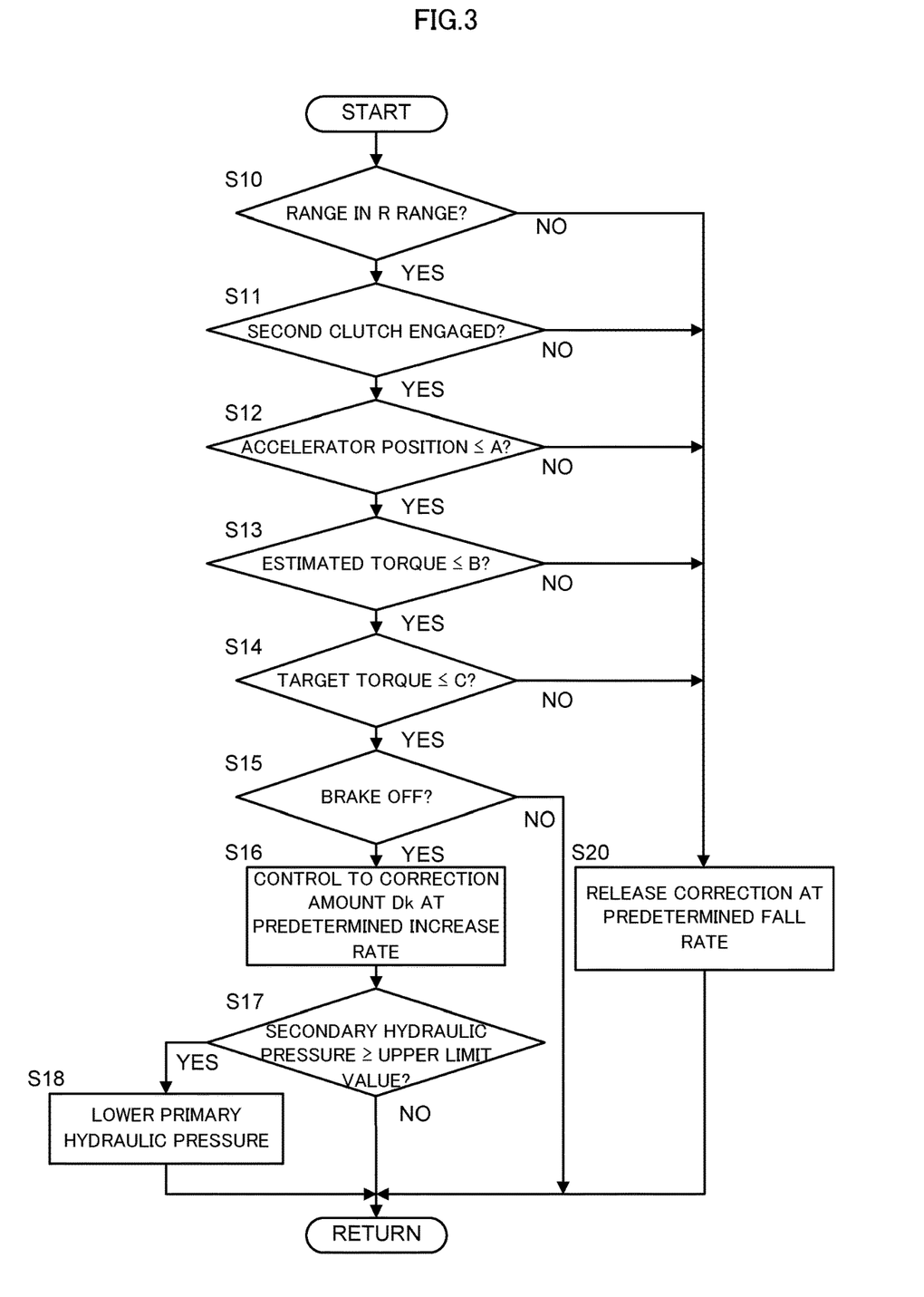
FIG. 3 is a flowchart for a control during braking executed by a CVT control unit of the embodiment of the present invention.
Figure 4:
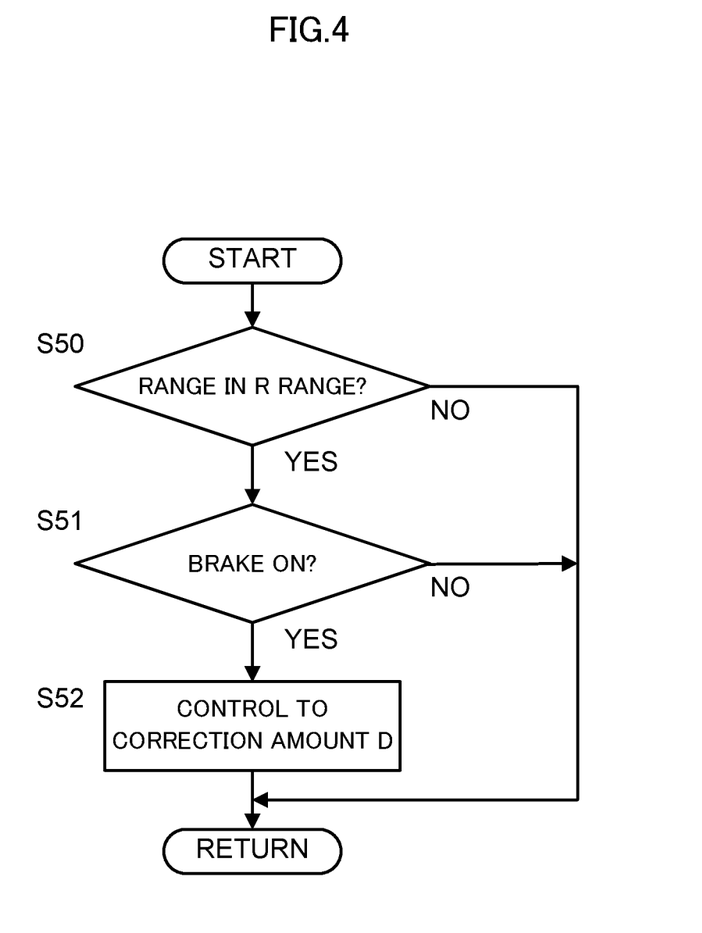
FIG. 4 is a flowchart for the control during the braking executed by the CVT control unit of the embodiment of the present invention.

FIG. 3 and FIG. 4 are flowcharts of the control during the braking executed by the CVT control unit 81 of this embodiment.

FIG. 3 illustrates processes from when the accelerator pedal is disengaged and the brake pedal is pressed during the running. FIG. 4 illustrates processes when the brake pedal is pressed.

The CVT control unit 81 executes the processes illustrated in FIG. 3 and FIG. 4 concurrently with another process at predetermined cycles (for example, every 10 ms).

First, the following describes processes illustrated in FIG. 3. At Step S10, the CVT control unit 81 obtains a signal from the inhibitor switch sensor 87 and determines whether a current range is at the R range (the retreat range). When it is determined that the range is the R range, the process transitions to Step S11.

As described above, this embodiment performs the control to increase the belt sandwiching force in the R range at which the torque especially increases. When it is determined that the range is not the R range, since the belt sandwiching force is not increased, the process transitions to Step S20.

At Step S20, a process to return the belt sandwiching force increased by the process at Step S16, which will be described later, to a state before the correction is performed. Specifically, this process reduces the correction amount from the increased belt sandwiching force. At this time, the belt sandwiching force is reduced at a predetermined gradient. The CVT control unit 81 instructs the shift hydraulic control unit 7 to reduce the belt sandwiching force. The shift hydraulic control unit 7 follows the instruction and controls the primary hydraulic pressure and the secondary hydraulic pressure. After the process at this step S20, the processes of this flowchart are once terminated and the process returns to another process.

At Step S11, the CVT control unit 81 determines whether the steering reverser mechanism 3 is in a lock-up state, that is, whether the reverse brake 32 is engaged. When the steering reverser mechanism 3 is determined as in the lock-up state, the process transitions to Step S12.

When the steering reverser mechanism 3 is not in the lock-up state, the torque from the driving wheel 6 side is input to the variator 4. However, since the steering reverser mechanism 3 on the upstream of the variator 4 is disengaged or slipped, a torsional torque applied to the variator 4 decreases. Accordingly, when the steering reverser mechanism 3 is not in the lock-up state, the belt sandwiching force needs not to be increased; therefore, the process transitions to Step S20.

At Step S12, the CVT control unit 81 determines whether the accelerator position is equal to or less than a predetermined value A.

When the driver disengages the accelerator pedal during the running, it can be estimated that the braking of the vehicle is planned. The CVT control unit 81 obtains the signal from the accelerator position sensor 85 and determines that the accelerator pedal is disengaged when the accelerator position is equal to or less than the predetermined value A. The predetermined value A is set to a value equivalent to the small accelerator position enough to be determinable that the accelerator pedal has been disengaged, for example, set to zero.

When it is determined that the accelerator position is equal to or less than the predetermined value A, the process transitions to Step S13. When the accelerator position is larger than the predetermined value A, it is determined that the vehicle is not braked. Since the belt sandwiching force needs not to be increased, the process transitions to Step S20.

At Step S13, the CVT control unit 81 determines whether an estimated value of the input torque input from the driving source to the variator 4 (an estimated torque) is equal to or less than a predetermined value B. A response from when the accelerator pedal is disengaged until an output torque from the driving source lowers delays. Considering this delay in response, the belt sandwiching force is not increased until the estimated torque becomes equal to or less than the predetermined value B.

The estimated torque is estimated on the basis of a driving command to the engine 1 by the engine control unit 84 and the target power running command and the target regeneration command by the motor control unit 83. Considering the variation of the estimated torque, the predetermined value B is set as follows. That is, in FIG. 6, even if the target torque becomes negative after the accelerator position becomes zero (a timing t02), the estimated torque during the deceleration running becomes close to zero, the estimated torque repeatedly exceeds and falls below zero, and a hunting where the value exceeds and falls below the positive value close to zero possibly occurs. Additionally, the variation of the operation possibly results in the positive estimated torque value. Thus, by setting a value larger than the positive value when the hunting and the variation of the operation occur as the predetermined value B allows preventing the operating state where this control is not executed.

When the estimated torque is determined as equal to or less than the predetermined value B, the process transitions to Step S14. When the estimated torque is larger than the predetermined value B, since the belt sandwiching force is not increased until the estimated torque sufficiently lowers, the process transitions to Step S20.

At Step S14, the CVT control unit 81 determines whether the target torque for the driving source is equal to or less than a predetermined value C.

If the target torque becomes large by, for example, the accelerator pedal being pressed again while the estimated torque is determined as equal to or less than the predetermined value B at Step S13, the input torque to the variator 4 increases. Considering this, when the target torque is larger than the predetermined value C, the belt sandwiching force is not increased.

The target torque is estimated on the basis of the driving command to the engine 1 by the engine control unit 84 and the target power running command and the target regeneration command by the motor control unit 83. The predetermined value C is set to a value by which the target torque for the driving source is determinable as small enough, for example, set to a value smaller than the predetermined value B. The predetermined value C is preferable to be zero.

When it is determined that the target torque is equal to or less than the predetermined value C, the process transitions to Step S15. When the target torque is larger than the predetermined value C, the belt sandwiching force is not increased; therefore, the process transitions to Step S20.

At Step S15, the CVT control unit 81 determines whether the brake pedal 63 has not been pressed, that is, the brake is OFF. The CVT control unit 81 obtains the signal from the brake sensor 64 and determines whether the brake is ON or OFF.

With the brake ON, a process to increase the belt sandwiching force, which will be described later, is not performed but the process in FIG. 4 to set the belt sandwiching force to a predetermined sandwiching force with the brake ON is performed. With the brake OFF, the process transitions to Step S16.

At Step S16, the CVT control unit 81 starts increasing the belt sandwiching force to the first correction amount Dk at a predetermined increase rate.

The first correction amount Dk at Step S16 is calculated by multiplying the correction amount D required for the belt sandwiching force while the brake is ON by a coefficient k ($0<k<1$).

The predetermined increase rate and the coefficient k are appropriately set in a range of not providing the uncomfortable feeling to the driver on the basis of the operating state of the vehicle. That is, as described above, in the case where the correction is performed while the brake is ON until the belt sandwiching force becomes the correction amount D, to prevent the change in the speed ratio due to the difference in the hydraulic pressures, the increase rate and the coefficient k are determined in a range of not changing the speed ratio. At the process in FIG. 4, which will be described later, similar to the increase to the correction amount D from the first correction amount Dk when the brake turns ON, the coefficient k is determined to prevent the speed ratio from changing due to the difference in the hydraulic pressures.

Next, at Step S17, the CVT control unit 81 determines whether the secondary hydraulic pressure supplied to the secondary hydraulic chamber 46 becomes an upper limit value preset to the secondary hydraulic chamber 46. When the CVT control unit 81 determines that the secondary hydraulic pressure becomes the upper limit value, the process transitions to Step S18. When the secondary hydraulic pressure is less than the upper limit value, the processes of this flowchart are once terminated and the process returns to another process.

The upper limit value is set to the secondary hydraulic pressure by, for example, a strength limit of the secondary hydraulic chamber 46. As a result of increasing the secondary hydraulic pressure to increase the belt sandwiching force, when the secondary hydraulic pressure becomes the upper limit value, the hydraulic pressure cannot be increased more than that.

In such case, to reduce the change in the speed ratio due to an unbalance between the secondary hydraulic pressure and the primary hydraulic pressure, the increase in the secondary hydraulic pressure is inhibited and the primary hydraulic pressure is changed (lowered) corresponding to the upper limit value of the secondary hydraulic pressure.

Figure 5:
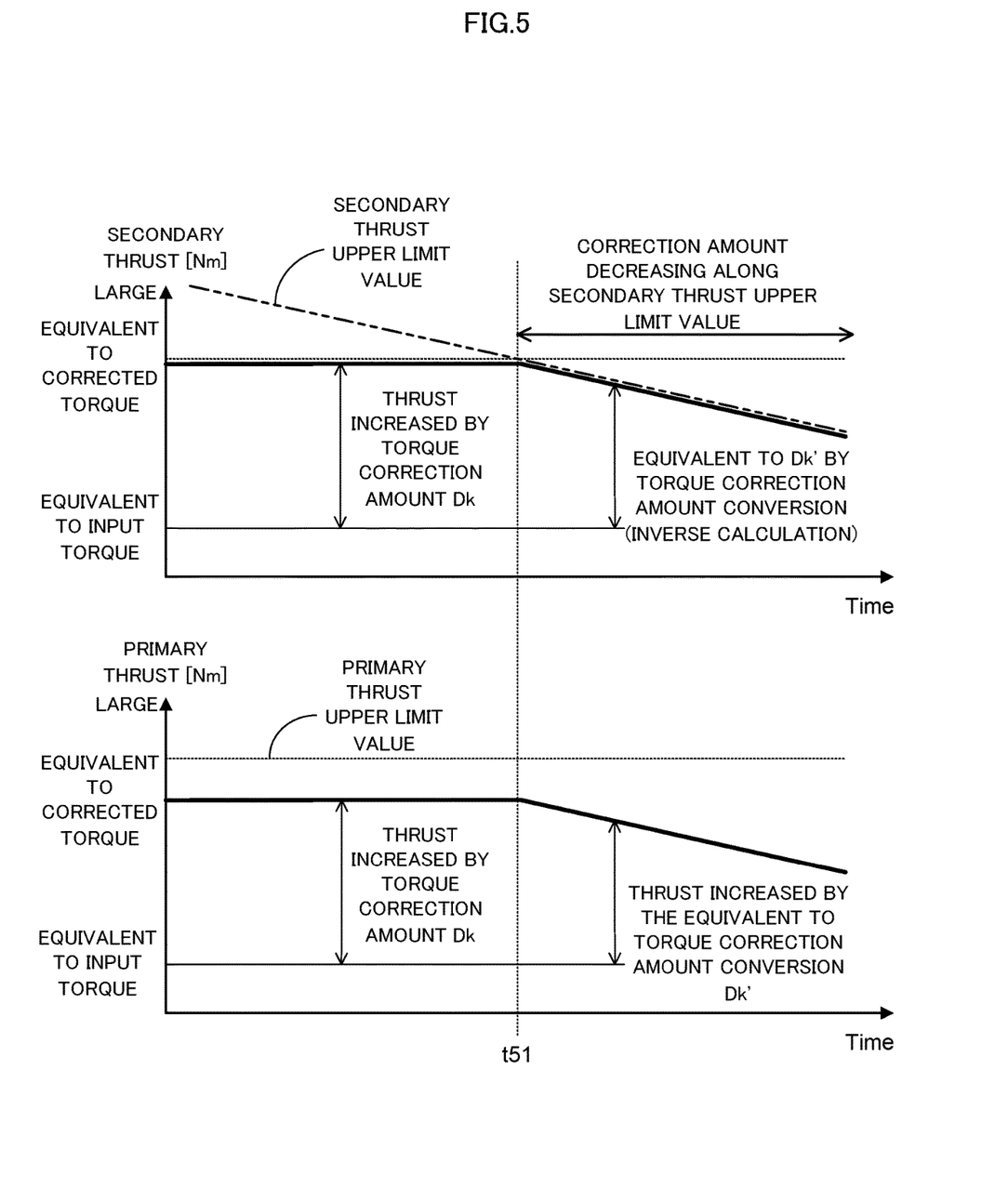
FIG. 5 is an explanatory diagram illustrating changes in a secondary hydraulic pressure and a primary hydraulic pressure of the embodiment of the present invention.

FIG. 5 is an explanatory diagram illustrating the changes of the secondary hydraulic pressure and the primary hydraulic pressure of this embodiment.

In FIG. 5, to increase the belt sandwiching force, the CVT control unit 81 supplies the primary hydraulic pressure and the secondary hydraulic pressure made to correspond to the first correction amount Dk from the shift hydraulic control unit 7.

Here, assume that the secondary hydraulic pressure reaches the upper limit value set to the secondary hydraulic chamber 46 at a timing t51. In this case, the secondary hydraulic pressure to increase the belt sandwiching force cannot be increased any further. The upper limit value changes depending on the operating state (the vehicle speed, the accelerator position, and a similar state).

In this case, the secondary hydraulic pressure is corrected so as not to exceed the upper limit value as indicated by the solid line. Furthermore, the CVT control unit 81 makes the primary hydraulic pressure to correspond to the upper limit value of the secondary hydraulic pressure and performs the control so as not to generate the difference in the hydraulic pressure.

By performing such control by the CVT control unit 81, the belt sandwiching force can be increased without the excess of the upper limit value set to the secondary hydraulic chamber 46.

At this time, if the belt sandwiching force falling below the first correction amount Dk results in the insufficient belt sandwiching force relative to the input torque, the second clutch (the reverse brake 32) may be slipped to absorb the torque.

After the process at Step S18, the processes of this flowchart are once terminated and the process returns to another process.

The following describes the processes illustrated in FIG. 4. At Step S50, the CVT control unit 81 obtains a signal from the inhibitor switch and determines whether the current range is at the R range (the retreat range). When it is determined that the range is the R range, the process transitions to Step S51. When it is determined that the range is not the R range, the processes of this flowchart are once terminated and the process returns to another process.

At Step S51, the CVT control unit 81 determines whether the brake pedal 63 is pressed and the brake turns ON.

With the brake ON, to set the belt sandwiching force to the correction amount D while the brake is ON (see FIG. 2), the process transitions to Step S52. When the brake is not ON, the processes of this flowchart are once terminated and the process returns to another process.

At Step S52, the CVT control unit 81 sets the belt sandwiching force to the correction amount D while the brake is ON. At this time, the sandwiching force by the first correction amount Dk set at Step S16 in FIG. 3 is compared with the belt sandwiching force by the correction amount D while the brake is ON and configures the setting such that the belt sandwiching force becomes any of the larger sandwiching force.

The CVT control unit 81 instructs the set belt sandwiching force to the shift hydraulic control unit 7. The shift hydraulic control unit 7 follows the instruction and controls the primary hydraulic pressure and the secondary hydraulic pressure.

Thus, in this embodiment, the CVT control unit 81 increases the belt sandwiching force in a range less than the predetermined value (the first correction amount Dk) before the braking force requested is performed by the brake ON at Step S16 in FIG. 3. Additionally, when the braking force request is performed, the CVT control unit 81 increases the belt sandwiching force up to the predetermined value (the correction amount D) to prevent the belt from slipping on the basis of the braking force request at Step S52 in FIG. 4.

After the process at Step S52, the processes of this flowchart are once terminated and the process returns to another process.

In the case where the braking force request (the brake ON) by the driver is planned, the above-described process increases the belt sandwiching force prior to the braking force request. Therefore, compared with the case where the belt sandwiching force is increased after the brake turns ON, this ensures controlling the amounts of change of the primary hydraulic pressure and the secondary hydraulic pressure small. Such control allows preventing the difference in the hydraulic pressures between the primary hydraulic chamber 45 and the secondary hydraulic chamber 46. Accordingly, the change in the speed ratio while the brake is ON can be prevented, ensuring preventing the driver from feeling uncomfortable.

Figure 6:
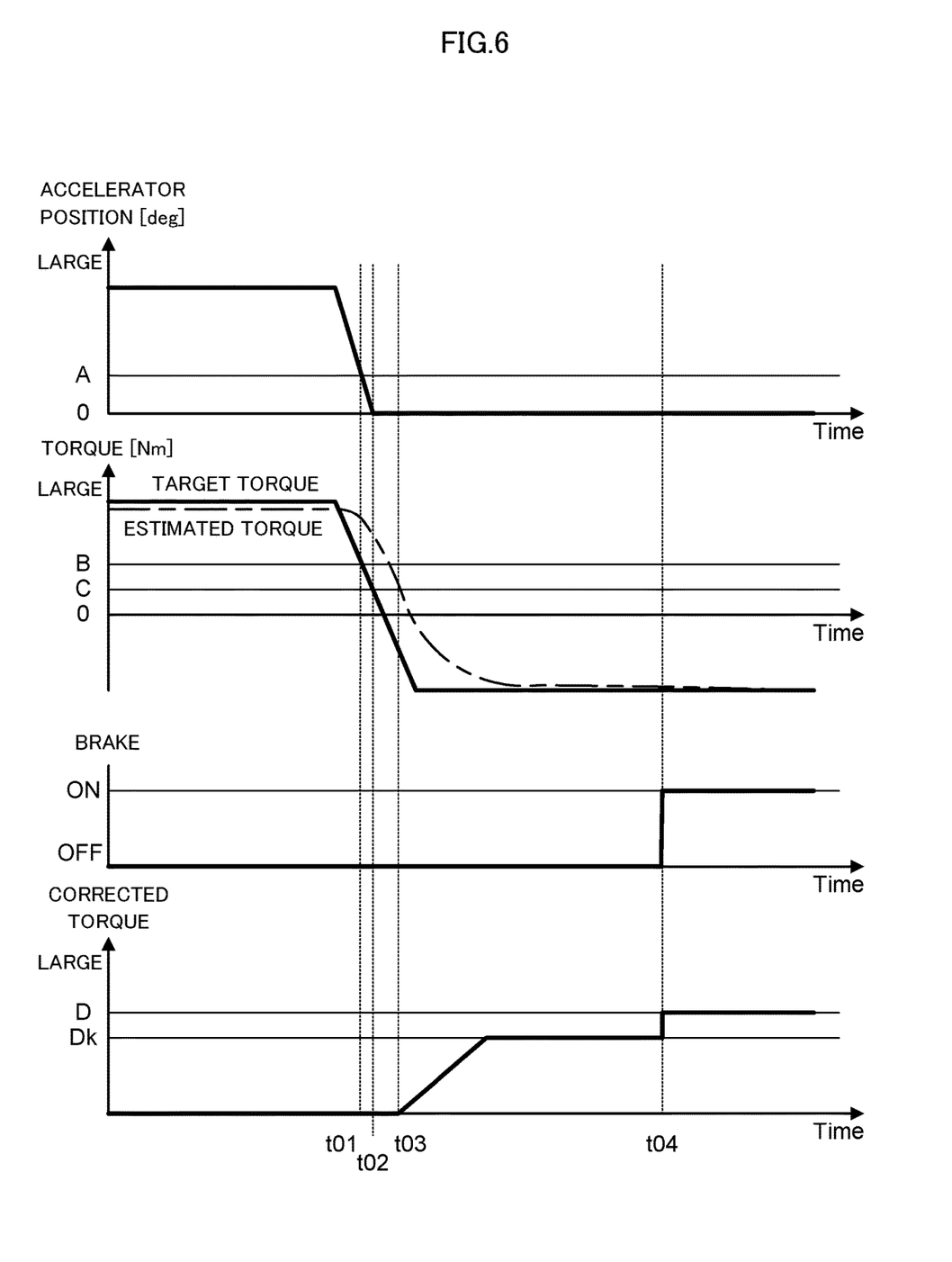
FIG. 6 is timing charts for the control during the braking executed by the CVT control unit of the embodiment of the present invention.

FIG. 6 is timing charts for the control executed by the CVT control unit 81 of the embodiment.

The timing charts illustrated in FIG. 6 illustrate, from the upper stage, the accelerator position [deg], the input torque to the variator 4 [Nm], the operating state of the brake pedal 63, and the amount of increase of the belt sandwiching force corresponding to the deceleration of the vehicle [Nm] with the time on the horizontal axes. The target torque is indicated by the solid line while the estimated torque is indicated by the one dot chain line.

FIG. 6 illustrates from the state where the brake pedal is pressed when the accelerator pedal is pressed and the vehicle is running until the state where the belt sandwiching force increases. Assume that that inhibitor switch is the R range.

Here, when the driver disengages the accelerator pedal intending the deceleration, the determinations at Steps S12 to S14 in FIG. 3 are performed. In the example of FIG. 6, it is determined that the accelerator position becomes equal to or less than the predetermined value A at a timing t01, the target torque becomes equal to or less than the predetermined value C at a timing t02, and the estimated torque becomes equal to or less than the predetermined value B at a timing t03.

At the timing t03 where these conditions are met, the process at Step S16 in FIG. 3 is performed. The CVT control unit 81 starts correcting the belt sandwiching force to the first correction amount Dk at the predetermined increase rate.

Afterwards, when the brake pedal is pressed, the conditions at Steps S50 and S51 in FIG. 4 are met, and the process at Step S52 is performed. This process increases the belt sandwiching force from the first correction amount Dk to the correction amount D while the brake is ON.

Compared with the case of increasing the belt sandwiching force to the correction amount D while the brake is ON, such control employs only the second correction amount (D−Dk) as the increased amount, thereby allowing decreasing the increased amount. Furthermore, for increase up to the first correction amount Dk, the belt sandwiching force is increased at the predetermined increase rate. Therefore, a time change to the increase up to the first correction amount Dk can be decreased.

Figure 7:
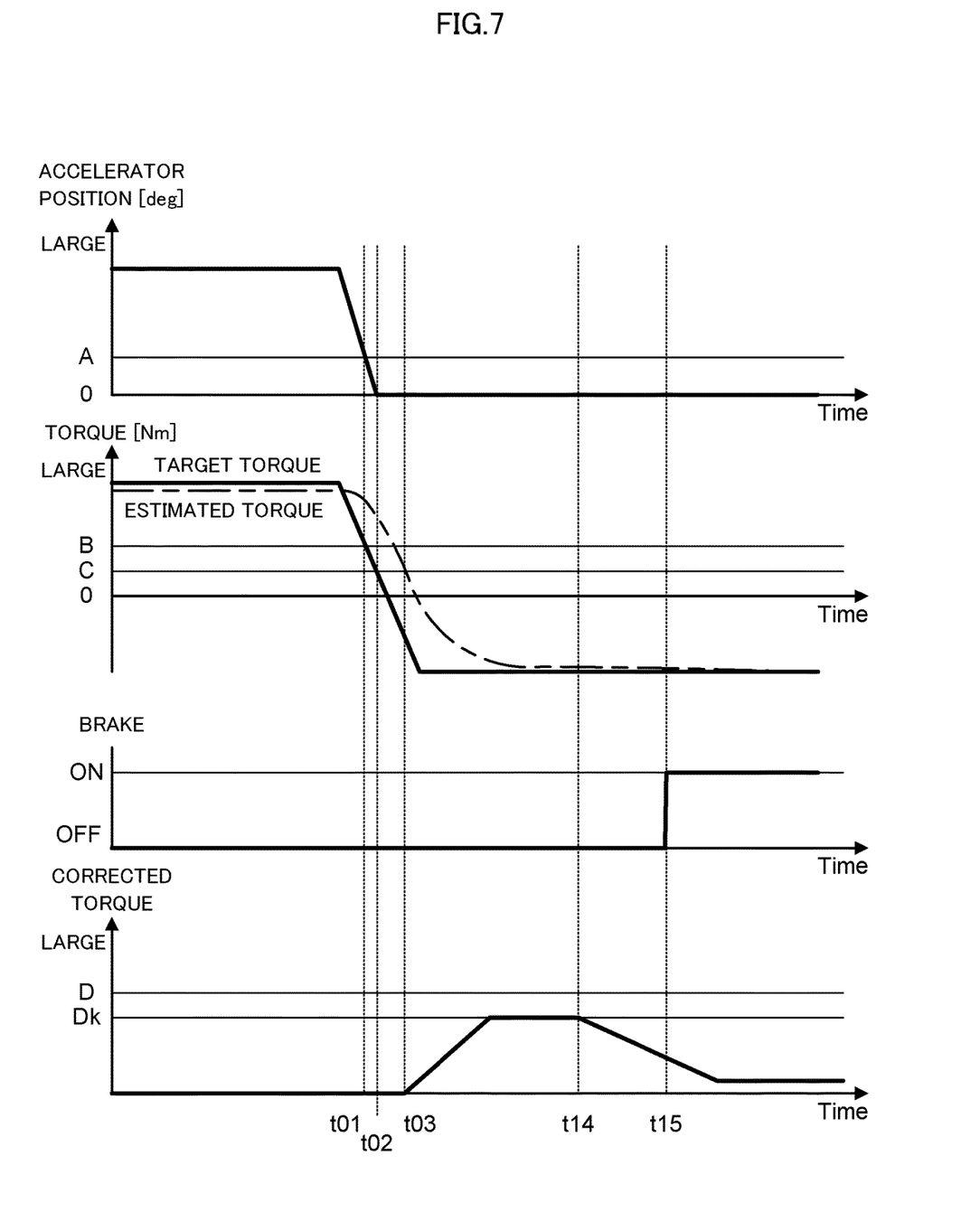
FIG. 7 is timing charts for the control during the braking executed by the CVT control unit of the embodiment of the present invention.

FIG. 7 is timing charts of another example for a control executed by the CVT control unit 81 of the embodiment.

Similar to FIG. 6, the timing charts illustrated in FIG. 7 illustrate, from the upper stage, the accelerator position [deg], the input torque to the variator 4 [Nm], the operating state of the brake pedal 63, and the amount of increase of the belt sandwiching force corresponding to the deceleration of the vehicle [Nm] with the time on the horizontal axes. The target torque is indicated by the solid line while the estimated torque is indicated by the one dot chain line.

Similar to FIG. 6, the control is performed from timings t01 to t03 in FIG. 7.

Here, the following describes the case where any of the determinations from Steps S10 to S14 in FIG. 3 is denied at a timing t14. It is assumed that in the example illustrated in FIG. 7, the second clutch (the reverse brake 32) of the steering reverser mechanism 3 is disengaged and the determination at Step S11 is denied. When the second clutch is disengaged, the torque input from the driving wheel 6 side is absorbed by the steering reverser mechanism 3; therefore, the belt sandwiching force needs not to be increased.

In this case, the process at Step S20 in FIG. 3 is executed. Specifically, the CVT control unit 81 releases the first correction amount Dk at a predetermined fall rate. That is, the correction amount of the belt sandwiching force is controlled to be 0.

After that, even with the brake ON (a timing t15), since the belt sandwiching force needs not to be increased, the release of the first correction amount Dk is continued and the correction is released.

As described above, this embodiment includes the variator 4 that includes the belt 44, which is disposed between the driving source (the engine 1 and the motor-generator 2) and the driving wheels 6 and wound around between the primary pulley 42 and the secondary pulley 43.

This embodiment is applied to the vehicle that includes the hydraulic pressure controller (the CVT control unit 81) to change the hydraulic pressures supplied to the primary pulley 42 and the secondary pulley 43 and to control the sandwiching force of the belt 44.

The CVT control unit 81 increases the belt sandwiching force by the primary pulley 42 and the secondary pulley 43 up to the predetermined value (the correction amount D) to prevent the belt 44 from slipping by the braking force on the basis of the braking force request (the brake ON) from the driver.

When the execution of the braking force request is planned, the CVT control unit 81 increases the belt sandwiching force in the range of less than the predetermined value (the first correction amount Dk ($0 < k < 1$)) before the braking force request is performed, for example, from when the accelerator pedal is disengaged until the brake pedal 63 is pressed.

With this configuration, in the case where the braking force request (the brake ON) by the driver is planned, the belt sandwiching force is increased up to the range of less than the predetermined value prior to the braking force request. Accordingly, compared with the case where the belt sandwiching force is increased after the brake turns ON, the amounts of change of the primary hydraulic pressure and the secondary hydraulic pressure (the amount of the second correction amount (D−Dk)) can be decreased. Such control allows preventing the difference in the hydraulic pressures between the primary hydraulic chamber 45 and the secondary hydraulic chamber 46. Accordingly, the change in the speed ratio while the brake is ON can be prevented, ensuring preventing the driver from feeling uncomfortable.

Furthermore, in this embodiment, when the torque input to the transmission becomes negative, the CVT control unit 81 increases the belt sandwiching force in the range of less than the predetermined value. For example, in the case where the accelerator pedal is disengaged from the state of the accelerator pedal being pressed and then the brake pedal 63 is pressed, in association with the disengagement of the accelerator pedal, the torque input to the variator 4 switches from positive to negative after a time point of the accelerator being completely released.

In a relationship between the input torque to the variator 4 and the required sandwiching force for the belt 44, the negative input torque changes sharply compared with the positive input torque due to a weight of the vehicle or a similar factor. In view of this, while the input torque is positive, for example, when the sandwiching force starts to be increased simultaneously with the disengagement of the accelerator pedal, simultaneously with the switching of the positive input torque to the negative input torque, the increase ratio of the required sandwiching force rapidly increases. Accordingly, there is more likely to vary the speed ratio in association with the increase in the required sandwiching force. Accordingly, this embodiment starts increasing the belt sandwiching force at the timing of switching the input torque to negative. For example, the predetermined value B is set to a sufficiently large value (for example, a value larger than the estimated torque previous to the timing t01 in FIG. 6), and the belt sandwiching force starts to be increased at the timing of switching the input torque to negative by the disengagement of the accelerator pedal. This configuration can prevent the variation of the speed ratio, thereby ensuring preventing the driver from feeling uncomfortable.

Furthermore, instead of the configuration where the CVT control unit 81 starts increasing the belt sandwiching force at the timing of switching of the input torque to the variator 4 from negative to positive, this embodiment may employ the configuration that determines that the braking force request is planned when the accelerator pedal is disengaged and starts increasing the belt sandwiching force. For example, a sufficiently large value (for example, a value larger than the target torque prior to the timing t01 in FIG. 6) is set to the predetermined value C and the belt sandwiching force starts to be increased at a timing when the accelerator pedal is disengaged. This configuration allows starting increasing the sandwiching force at the timing as early as possible. Therefore, even if the time from when the accelerator pedal is disengaged until the braking force request is performed is short, the belt sandwiching force can be increased. Accordingly, this ensures decreasing the increased amount of the sandwiching force required when the braking force request is performed, the change in the speed ratio can be prevented, and providing the uncomfortable feeling to the driver can be prevented.

Furthermore, in this embodiment, in the case where the belt sandwiching force is equal to or more than the regulated upper limit value when the accelerator pedal is disengaged, the CVT control unit 81 inhibits the increase in the belt sandwiching force.

If the secondary hydraulic pressure approaches the upper limit value, for example, the strength limit of the secondary hydraulic chamber 46 when the belt sandwiching force is increased, the sandwiching force of the secondary pulley 43 cannot be increased any further or the increase margin becomes slight. Increasing the sandwiching forces of both pulleys in such case increases the increased amount of the sandwiching force of the primary pulley 42 relative to the increased amount of the sandwiching force of the secondary pulley 43, causing an unintended shift. To prevent this, when the belt sandwiching force is equal to or more than the regulated upper limit value, the increase in the belt sandwiching force is inhibited. This allows preventing the change in the speed ratio and allows preventing the driver from feeling uncomfortable.

Furthermore, in this embodiment, the CVT control unit 81 increases the belt sandwiching force by the first correction amount Dk before the execution of the braking force request. When the braking force request is performed, the CVT control unit 81 increases the belt sandwiching force by the second correction amount (D−DK). In the case where the sum of the first correction amount Dk and the second correction amount (D−Dk) is the predetermined value (the correction amount D) and the belt sandwiching force is increased by the second correction amount (D−Dk), the second correction amount (D−Dk) is set in the range where the difference in the hydraulic pressures does not occur between the primary pulley 42 and the secondary pulley 43.

Such control allows reducing the amounts of change of the hydraulic pressures of the primary hydraulic chamber 45 and the secondary hydraulic chamber 46 and therefore can prevent causing the difference in the hydraulic pressures. This can prevent the change in the speed ratio while the brake is ON and can prevent the driver from feeling uncomfortable.

Furthermore, in this embodiment, the steering reverser mechanism 3 configures the reduction gear ratio during the forward running larger than the reduction gear ratio during the reverse running. Such configuration decelerates the negative torque input during the reverse running by the reduction gear ratio of the steering reverser mechanism. Therefore, the belt sandwiching force by the amount equivalent to the difference in the reduction gear ratios can be increased during the reverse running.

Furthermore, in this embodiment, the steering reverser mechanism 3 includes the sun gear to which the power of the driving source is input, the ring gear, the carrier that supports the pinion gear, which meshes with the sun gear and the ring gear, the forward clutch 31 configured to integrally rotate the sun gear and the carrier in the engagement state, and the reverse brake 32 that can stop the rotation of the ring gear in the engagement state. In the case where the braking force request is planned while the reverse brake 32 is engaged, the CVT control unit 81 increases the belt sandwiching force in the range of less than the predetermined value prior to the execution of the braking force request.

When the steering reverser mechanism 3 thus configured is provided, the torque from the driving wheel 6 side increases the speed by the reduction gear ratio during the braking force request in the reverse running and the torque is transmitted to the driving source side. That is, the inertias of the engine 1 and the motor-generator 2, which are disposed upstream of the steering reverser mechanism 3, become excessive. Therefore, the belt sandwiching force needs to be increased during the reverse running to prevent the belt 44 from slipping when the braking force request is performed. Therefore, the configuration that thus includes the steering reverser mechanism 3 performs the control to increase the belt sandwiching force during the reverse running. Accordingly, the variation of the speed ratio can be prevented and providing the uncomfortable feeling to the driver can be prevented.

The embodiment of the present invention described above is merely illustration of one of application examples of the present invention and not of the nature to limit the technical scope of the present invention to the specific constructions of the above embodiments.

The embodiment employs the engine 1 and the motor-generator 2 as the driving source. Meanwhile, the vehicle may include only the engine 1 or the vehicle may be an electric vehicle that includes only the motor-generator 2.

The embodiment disposes the steering reverser mechanism 3 on the upstream of the variator 4, that is, between the variator 4 and the driving source. Meanwhile, the steering reverser mechanism 3 may be disposed on the downstream of the variator 4, that is, between the variator 4 and the final reduction gear 5.

The present application claims a priority based on JP2015-059509 filed before the Japanese Patent Office on Mar. 23, 2015, the entire contents thereof is incorporated herein by reference.

The invention claimed is:

1. A vehicle comprising:
a variator disposed between a driving source and a driving wheel, the variator including a belt wound around between a primary pulley and a secondary pulley; and
a hydraulic pressure controller configured to
change hydraulic pressures supplied to the primary pulley and the secondary pulley to control a belt sandwiching force,
increase the belt sandwiching force by the primary pulley and the secondary pulley on a basis of a braking force request from a driver up to a predetermined value, to prevent the belt from slipping due to a braking force, and
gradually increase the belt sandwiching force before the braking force request occurs, up to a value larger than a belt sandwiching force necessary to prevent the belt from slipping before the braking force request occurs and in a range of less than the predetermined value at a predetermined increase rate.

2. The vehicle according to claim 1, wherein
when a torque input to the variator becomes negative, the hydraulic pressure controller is configured to increase the belt sandwiching force in the range of less than the predetermined value.

3. The vehicle according to claim 2, wherein
when the belt sandwiching force is equal to or more than a predetermined upper limit value upon increasing the belt sandwiching force in the range of less than the predetermined value, the hydraulic pressure controller is configured to inhibit the increase of the belt sandwiching force.

4. The vehicle according to claim 1, wherein
when an accelerator pedal is disengaged, the hydraulic pressure controller is configured to start increasing the belt sandwiching force in the range of less than the predetermined value.

5. The vehicle according to claim 1, wherein:
the hydraulic pressure controller is configured to
increase the belt sandwiching force by a first correction amount before the braking force request occurs, and
increase the belt sandwiching force by a second correction amount when the braking force request occurs,
the predetermined value is a sum of the first correction amount and the second correction amount, and
the second correction amount is set in a range where a change in a speed ratio of the variator caused by increasing the belt sandwiching force by the second correction amount is within a predetermined variation width.

6. The vehicle according to claim 1, further comprising a steering reverser disposed between the driving source and the variator, wherein the steering reverser has a reduction gear ratio during forward running which is larger than a reduction gear ratio during reverse running.

7. The vehicle according to claim 1, further comprising a steering reverser disposed between the driving source and the variator, the steering reverser comprising:
a sun gear to which a power from the driving source is input;
a ring gear arranged to be coupled;
a carrier that supports a pinion gear meshing with the sun gear and the ring gear;
a forward clutch configured to rotate the sun gear and the carrier integrally in an engagement state; and
a reverse brake configured to stop a rotation of the ring gear in an engagement state,
wherein the hydraulic pressure controller is configured to increase the belt sandwiching force in the range of less than the predetermined value before the braking force request occurs when the reverse brake is in the engagement state.

8. A method for controlling a vehicle including a variator disposed between a driving source and a driving wheel, and a hydraulic pressure controller, the variator including a belt wound around between a primary pulley and a secondary pulley, the hydraulic pressure controller being configured to change hydraulic pressures supplied to the primary pulley and the secondary pulley to control a belt sandwiching force, the method comprising:
upon increasing the belt sandwiching force by the primary pulley and the secondary pulley on a basis of a braking force request from a driver up to a predetermined value to prevent the belt from slipping due to a braking force, gradually increasing the belt sandwiching force before the braking force request occurs, up to a value larger than a belt sandwiching force necessary to prevent the belt from slipping before the braking force request occurs and in a range of less than the predetermined value at a predetermined increase rate.

9. A vehicle comprising:
a variator disposed between a driving source and a driving wheel, the variator including a belt wound around between a primary pulley and a secondary pulley; and
control means for controlling a belt sandwiching force through changing hydraulic pressures supplied to the primary pulley and the secondary pulley, wherein
the control means
increases the belt sandwiching force by the primary pulley and the secondary pulley on a basis of a braking force request from a driver up to a predetermined value, to prevent the belt from slipping due to a braking force, and
increases the belt sandwiching force in a gradual manner before the braking force request occurs, up to a value larger than a belt sandwiching force necessary to prevent the belt from slipping before the braking force request occurs and in a range of less than the predetermined value at a predetermined increase rate.

* * * * *